United States Patent

Planeta et al.

[11] Patent Number: 6,159,616
[45] Date of Patent: Dec. 12, 2000

[54] MULTILAYER PLASTIC FILM

[75] Inventors: Mirek Planeta; Harinder Tamber, both of Mississauga, Canada

[73] Assignee: Macro Engineering & Technology Inc.

[21] Appl. No.: 09/263,870

[22] Filed: Mar. 8, 1999

[51] Int. Cl.[7] ..................................................... B32B 27/08
[52] U.S. Cl. .......................... 428/518; 428/213; 428/221; 428/500; 428/515; 428/519; 428/521; 264/510; 264/552; 264/556
[58] Field of Search ..................................... 428/213, 221, 428/500, 515, 518, 519, 521; 264/510, 552, 556

[56] References Cited

U.S. PATENT DOCUMENTS

| 3,741,253 | 6/1973 | Brax et al. | 138/137 |
| 4,161,562 | 7/1979 | Yoshikawa et al. | 428/215 |
| 4,448,792 | 5/1984 | Schirmer | 426/113 |
| 4,892,765 | 1/1990 | Hisazumi et al. | 428/34.8 |
| 4,906,517 | 3/1990 | Akao et al. | 428/216 |
| 4,959,271 | 9/1990 | Sun | 428/476.3 |
| 5,073,617 | 12/1991 | Jorge et al. | 526/343 |
| 5,110,643 | 5/1992 | Akao et al. | 428/35.9 |

*Primary Examiner*—Samuel A. Acquah
*Attorney, Agent, or Firm*—Robert F. Delbridge

[57] ABSTRACT

A multilayer plastic film has at least two inner polyvinylidene chloride (PVDC) layers, outer layers comprising a polyolefin homopolymer, copolymer or ionomer, and bonding layers between the PVDC layers and between the PVDC layers and the outer layers.

17 Claims, 3 Drawing Sheets

MULTILAYER PLASTIC FILM

FIELD OF THE INVENTION

This invention relates to multilayer plastic films suitable for packaging food products such as cheese, processed meat and raw meat.

BACKGROUND OF THE INVENTION

There is a need in the food packaging industry for packaging film with improved structural integrity and which can be made into bags. Food products such as cheese, processed meat and raw meat are preferably packed by using film with high barrier resistance to moisture and oxygen. A typical way of protecting such food products from moisture and oxygen is by shrink packaging in high barrier film. A useful film with good moisture and oxygen barrier properties for this purpose comprises a copolymer of vinylidene chloride with a monomer such as methyl acrylate, vinyl chloride or other unsaturated monomer.

It is also known to provide a multilayer shrink film with a five layer structure, namely a first outer layer, a bonding layer, a barrier layer, a further bonding layer and a further outer layer, to achieve the desired properties. A known multilayer shrink film of this kind having good moisture and oxygen barrier properties for use in packaging food products has a barrier layer comprising a polymer such as a copolymer of vinylidene chloride, ethyl vinyl alcohol (EVOH) or other barrier polymer. It is necessary for the film to meet a number of criteria, such as being heat sealable, delamination resistant and providing a good moisture and oxygen barrier. The film should shrink from about 30 to about 50% at 90° C. in both longitudinal and transverse directions and be capable of withstanding physical abuse during transportation. Other layers of the film are selected to provide requisite low temperature properties and abrasion resistance which are lacking in the barrier layer.

U.S. Pat. No. 3,741,253 (Brax et al) describes a multilayer barrier shrink film with a first outer layer of cross linked ethylene vinyl acetate polymer, a middle layer of a polymer of vinylidene chloride and a second outer layer of an ethylene/vinyl acetate polymer.

U.S. Pat. No. 4,892,765 (Hisazumi et al) describes a multilayer heat shrinkable film comprising a core layer of a copolymer of vinylidene chloride, outer layers of a polyamide and adhesive layers between the core layer and the outer layers.

U.S. Pat. No. 4,161,562 (Yoshikwa et al) describes a biaxially stretched five-layer film for packaging fatty food products of irregular shape. The film comprises a first outer layer of an ionomer, an olefin homopolymer or an olefin copolymer, or a mixture of the olefin homopolymer with the olefin copolymer, a second layer of an ethylene copolymer, a third layer of a vinylidene copolymer, a fourth layer of an ethylene copolymer and a fifth layer (second outer layer) of an ionomer.

In these prior patents, which are hereby incorporated herein by reference, a copolymer of vinylidene chloride comprises 65 to 95% by weight of vinylidene chloride and 5 to 35% by weight of at least one unsaturated monomer which is copolymerizable with vinylidene chloride, such as methyl acrylate or vinyl chloride. The copolymer is also blended with additives such as heat stabilizers and plasticizing compounds such as epoxyidized soybean oil and steramide known in the art. An amount of comonomer with vinylidene chloride is used to facilitate processability of the polyvinylidene chloride (PVDC) copolymer. However, higher amounts of the comonomer in the copolymer lower the barrier properties of the PVDC layers, and a high percentage of PVDC results in the copolymer becoming brittle and susceptible to cracking.

Yoshikawa et al teach that a PVDC layer in the multilayer film is likely to crack if the thickness of the PVDC exceeds about 15 microns due to low temperature brittleness of this polymer. In fact, cracking in a layer is a general problem in the manufacturing of multilayer film, especially when utilizing rigid or easily degradable polymers such as PVDC or EVOH. The thickness of such a barrier layer therefore has to be limited to minimize the likelihood of cracking.

A primary object of the invention is therefore to provide a multilayer plastic film with good barrier properties for moisture and oxygen and which is at least substantially free from the problems referred to above, as well as being substantially free from fine pin holes and stress cracking of barrier polymers, especially with greater thicknesses and also especially when VDC content is greater than about 95%. A relatively thick polymer layer is much more brittle than a copolymer layer with 80 to 90% VDC monomer.

SUMMARY OF THE INVENTION

According to the present invention, a multilayer plastic film has at least two inner polyvinylidene chloride (PVDC) layers, outer layers comprising a polyolefin homopolymer, copolymer or ionomer, and bonding layers between the PVDC layers and between the PVDC layers and the outer layers.

Each PVDC layer may comprise from about 90 to about 98%, preferably from about 95 to about 98%, by weight of vinylidene chloride, and may comprise at least one copolymer selected from the group consisting of vinylidene chloride-methyl acrylate copolymer, vinylidene chloride-vinyl chloride copolymer and vinylidene chloride-acrylic acid copolymer. Each PVDC layer may have a thickness in the range of from about 3 to about 15 microns, preferably in the range of from about 3 to about 10 microns.

A first outer layer may have a thickness in the range of from about 10 to about 50 microns, preferably in the range of from about 20 to about 40 microns. The first outer layer may comprise at least one material selected from the group consisting of low density polyethylene, linear low density polyethylene, metalocens-based linear low density polyethylene, polypropylene, copolymers of polypropylene, high density polyethylene and ionomers.

A second outer layer may have a thickness in the range of from about 10 to about 50 microns, preferably in the range of from about 20 to about 40 microns. The second outer layer may comprise at least one material selected from the group consisting of low density polyethylene, linear low density polyethylene, metalocens-based linear low density polyethylene, polypropylene, copolymers of polypropylene, high density polyethylene and ionomers.

Each bonding layer may have a thickness in the range of from about 3 to about 10 microns, and may comprise at least one material selected from the group consisting of ethylene vinyl acetate, ethylene methyl-acrylate and ethylene-acrylic acid copolymer.

The multilayer plastic film may have a thickness in the range of from about 30 to about 100 microns, preferably in the range of from about 40 to about 75 microns. There may be at least three inner PVDC layers.

The present invention also provides a method of producing a multilayer plastic film comprising extruding multilayer plastic material in tubular bubble form to provide a multilayer plastic film having at least two inner PVDC layers, outer layers comprising an olefin homopolymer, copolymer or ionomer, and bonding layers between each pair or PVDC layers and between each PVDC layer and an outer layer, and cooling and collapsing the tubular film to sheet form.

The method may also include subsequently returning the collapsed film to a second tubular bubble form, stretching the second tubular bubble radially and longitudinally to produce a biaxially oriented heat shrinkable film, and collapsing the second tubular bubble to a further sheet form.

The further sheet form may be partially crosslinked by exposure to high energy electrical radiation.

DESCRIPTION OF THE DRAWINGS

Embodiments of the invention will now be described, by way of example, with reference to the accompanying drawings, of which.

DESCRIPTION OF PREFERRED EMBODIMENTS

Figure 1:
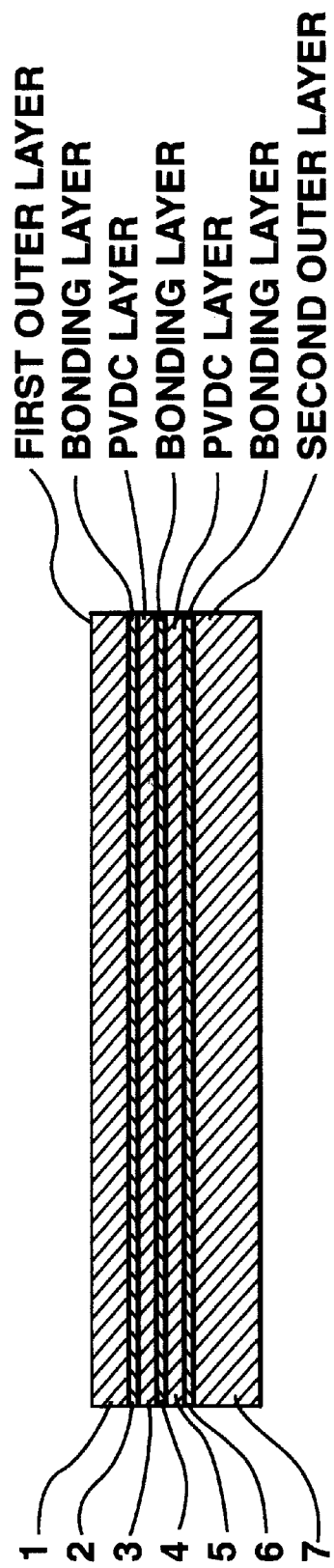
FIG. 1 is a cross sectional view of a seven layer plastic film in accordance with the invention.

In one embodiment of the invention, a seven-layer plastic film with excellent moisture and oxygen barrier properties and sealability has (see FIG. 1) third and fifth PVDC barrier layers each comprising a copolymer of vinylidene chloride and methyl acrylate. The copolymer contains 90 to 98% by weight of vinylidene chloride, with methyl acrylate, vinyl chloride or acrylic acid, together with heat stabilizers and plasticizers known in the art and some proprietary additives. The PVDC layers provide excellent oxygen and moisture barrier properties and also possess oil resisting properties.

Olefin homopolymers, copolymers or ionomers are used in a first outer layer, the purpose of which is to provide abuse resistance during handling and transportation, cold resistance, heat resistance to around 90 to 98° C. during cook-in applications and oil resistance in the presence of fats. In the first outer layer, olefin copolymers or ionomers containing 90 to 98% by weight of ethylene or olefin homopolymers may be used. Such resins have a melt index of from about 0.3 to about 3.0 decigram per minute, and a density from about 0.89 to 0.96 g/cm$^3$. The first outer layer may have a thickness from about 10 to about 50 microns, preferably from about 20 to about 40 microns.

Figure 2:
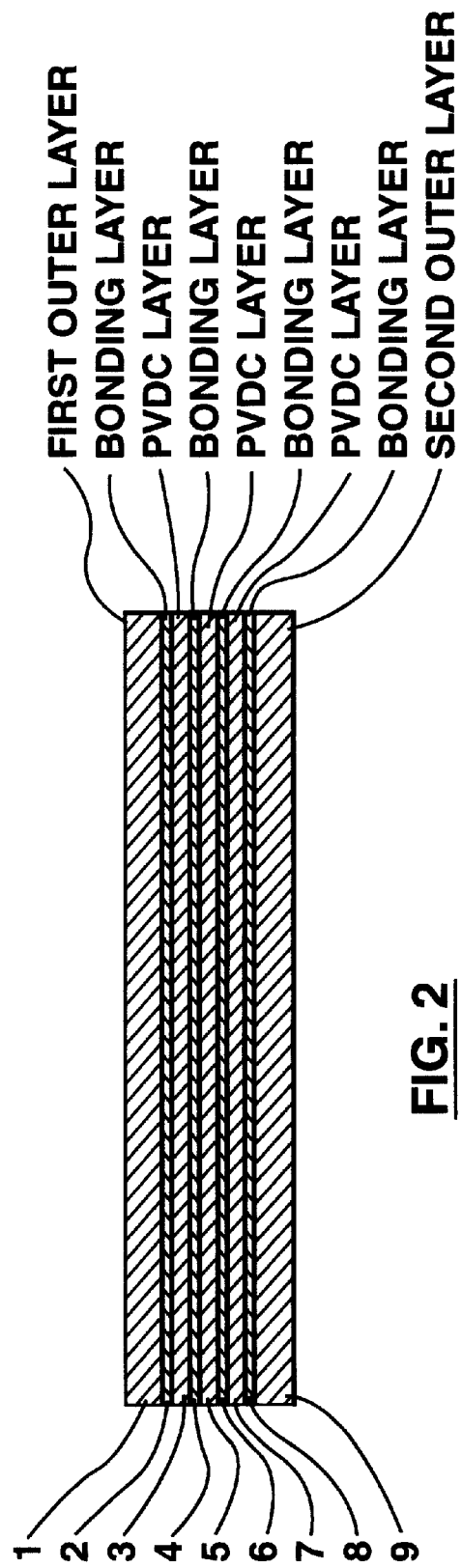
FIG. 2 is a similar view of a nine layer plastic film in accordance with the invention.

Each PVDC layer has a thickness from about 3 to about 15 microns. For low temperature flexibility, it is preferred that each PVDC layer has a thickness from about 3 to about 10 microns, resulting in a total PVDC thickness of about 6 to about 20 microns. To produce a film with still further improved barrier properties, three PVDC layers may be provided, thereby producing a nine-layer film (see FIG. 2).

The bonding layers may comprise ethylene vinyl acetate copolymer having a melt index from about 0.1 to about 6.0 decigram per minute, and a vinyl acetate content of from 9 to 36% by weight based on the weight of the copolymer. A blend of two or more ethylene-vinyl acetate copolymers may be used in the bonding layers. The bonding layers have a thickness from about 3 to about 10 microns. Ethylene acrylates may also be used in bonding layers, with the acrylate contents preferably being from about 2 to about 24% by weight of the polymer with a melt index of from about 0.1 to about 6 decigram per minute.

In the present invention, olefin homopolymers, copolymers or ionomers are used as the second outer layer, i.e. the seventh layer in a seven layer laminate film and the ninth layer in a nine-layer laminate film. The purpose of the second outer layer is to provide heat sealing ability, oil resistance in the presence of fats, seal strength during cook-in applications and during the shelf life of the film with minimum lowering of seal strength. For the second outer layer, olefin copolymers or ionomers containing from about 90 to about 98% by weight of ethylene or olefin homopolymers as a PP and CPP may be used. Such resins have a melt index from about 0.3 to about 3.0 decigram per minute, and a density of from about 0.80 to about 0.96 g/cm$^3$. The second outer layer preferably has a thickness in the range of from about 10 to about 50 microns, preferably from about 20 to about 40 microns.

The total thickness of the multilayer plastic film will generally be from about 30 to about 100 microns, and preferably from about 40 to about 75 microns.

Figure 3:
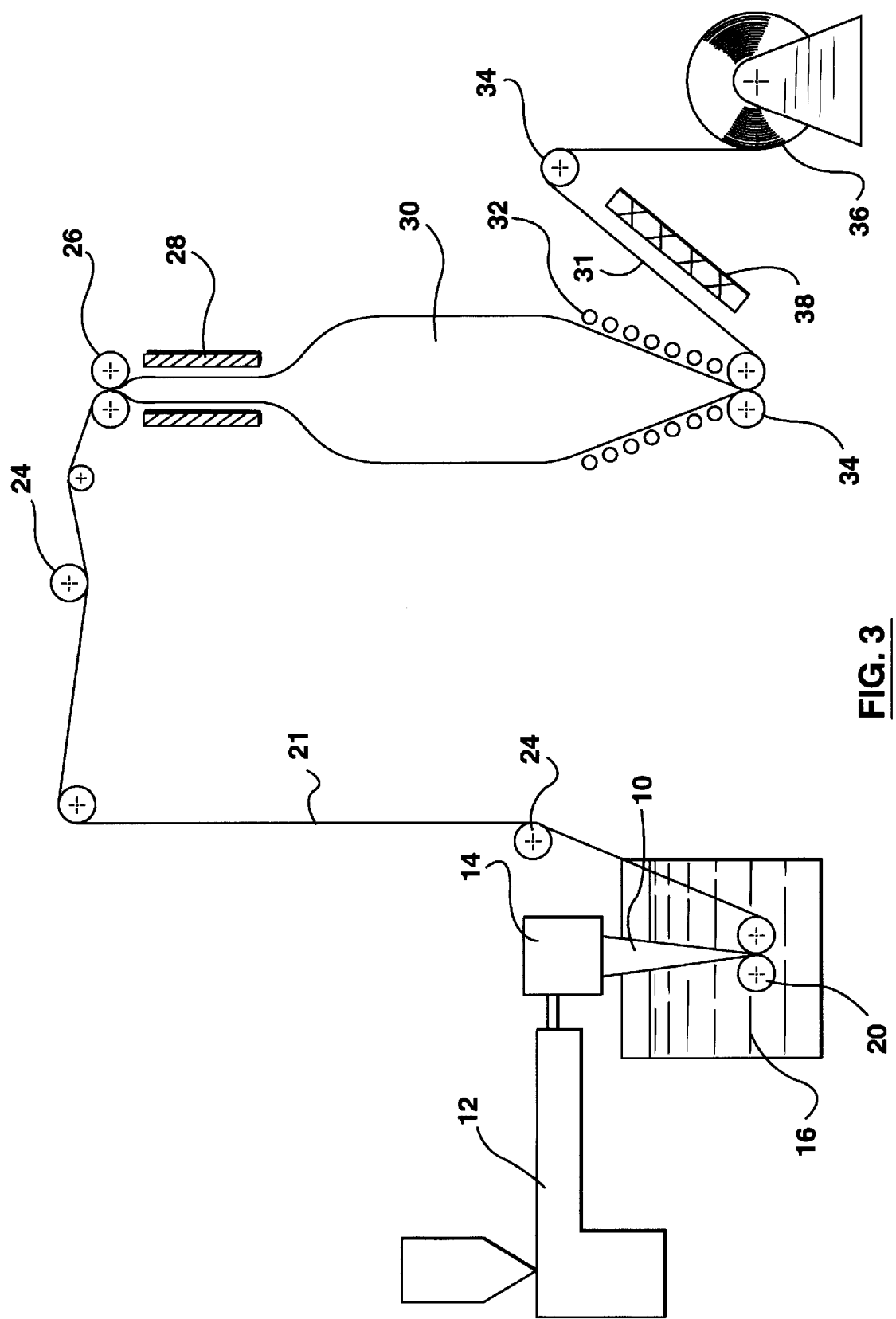
FIG. 3 is a schematic diagram showing the production of a biaxially oriented heat shrinkable multilayer plastic film by means of a double bubble blown film process.

A biaxially oriented heat shrinkable multilayer film in accordance with the present invention may be produced by the known double bubble method. Referring now to FIG. 3, a tubular seven layer film is produced by using seven extruders 12 (only one of which is shown). The polymers extruded by the extruders 12 are fed to an annular die 14, and the tubular film with seven layers is extruded downwardly therefrom. The tubular seven layer film is cooled in a cold water tank 16 located under the die 14 and containing water at a temperature of about 25° C. or lower. The bubble 10 formed by the multilayer film is squeezed out by nip rolls 20 in the cold water tank 16 which collapse the film from bubble form to sheet form.

The cold water in the tank 16 quenches the tubular film to maintain the amorphous state of the plastic material and to lower the temperature thereof so that substantially no crystalline growth occurs in the PVDC layers which would inhibit the subsequent process of orientation.

The collapsed film 21 from the cold water tank 16 is passed over idler rolls 24 and through a pair of nip rolls 26. The collapsed film 21 is passed from the nip rolls 26 through an infrared heating section 28 and blown to form a second bubble 30, which is subsequently collapsed by a collapsing frame 32. The collapsed film 31 then passes through a pair of nip rolls 34 which are rotated at three to five times faster than the nip rolls 26, with the air in the bubble 30 being entrapped therein by the rolls 26, 34. This results in biaxial orientation of the film lengthwise and breadthwise. The collapsed film 31 is then passed over further idler rolls 34 and wound in the form of a roll 36.

The collapsed film may travel past an annealing station 38 which stabilized the film to prevent shrinkage on the roll 36. The film may be slit to remove trim if desired.

Figure 4:
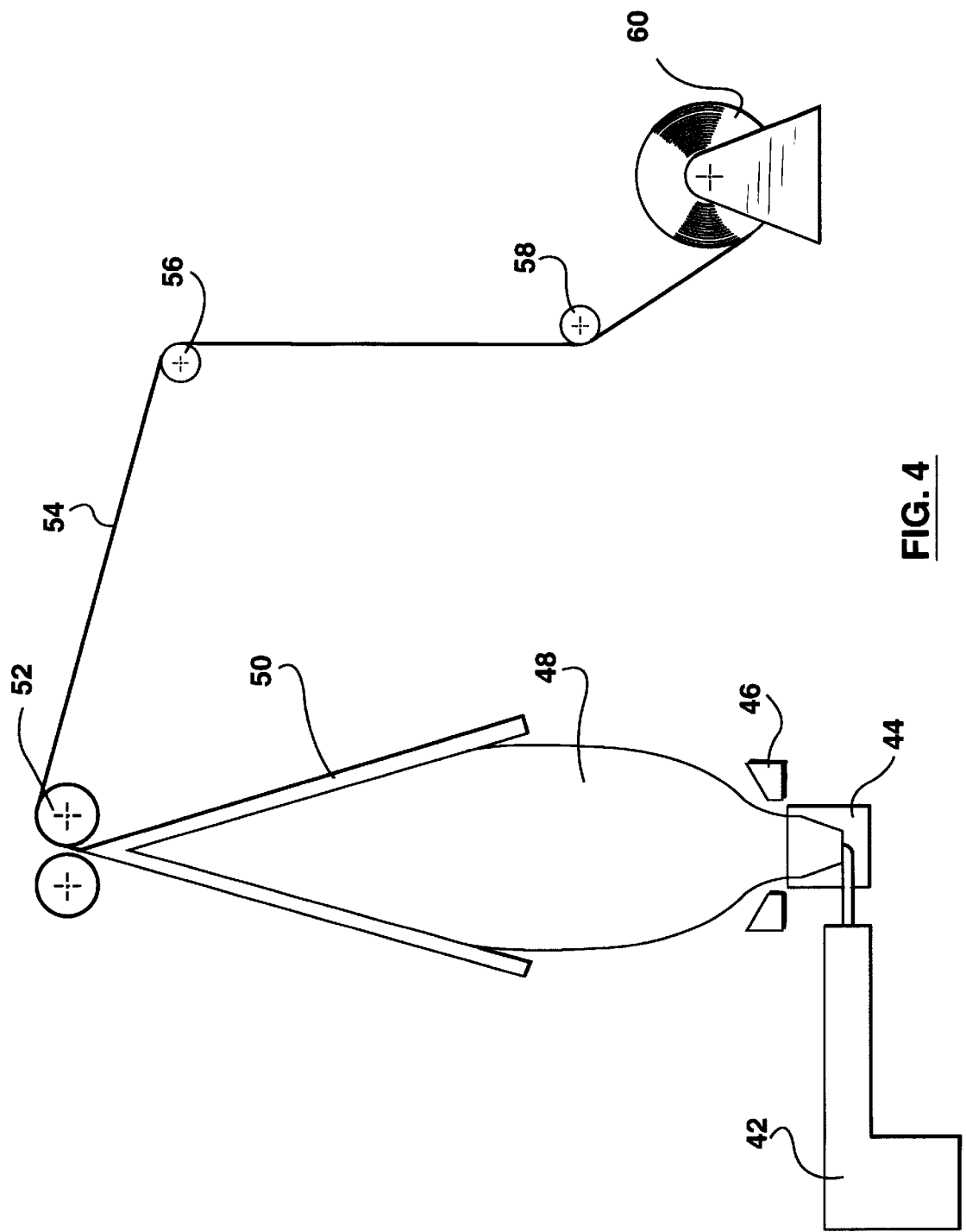
FIG. 4 is a schematic drawing showing the production of multilayer plastic film by means of a single bubble blown film process.

Multilayer film in accordance with the invention may also be produced by a single bubble blown film process. Referring now to FIG. 4, a tubular seven layer film is produced by using seven extruders 42 (only one of which is shown). The polymers extruded by the extruders 42 are fed to an annular die 44, and the tubular film is extruded upwardly therefrom through an air ring 46 which cools the film. Tubular film passes upwardly in the form of a bubble 48 to a collapsing frame 50 where the tubular film is collapsed into sheet form and passes through nip rolls 52. The flattened film 54 subsequently passes over idler rolls 56, 58 and is wound onto roll 60.

Use of this invention enables multilayer films to be produced in which each PVDC layers has a thickness less than about 15 microns therefore has minimal susceptibility to cracking. Also, because of the presence of a plurality of PVDC layers, the possibility of problems arising from pinholes therein is minimized since a pinhole in one layer is most unlikely to be aligned with a pinhole in another layer.

The dies 14 or 44 may be of the kind described in U.S. Pat. No. 5,788,902 (Planeta) issued Aug. 4, 1998 or in U.S. patent application Ser. No. 09/082,477 filed May 21, 1998 which describe and claim inventions relating to the extrusion of plastic materials in multilayer tubular film which is especially useful when one of the plastic materials (such as PVDC) is readily degradable.

Specific examples of the present invention will now be described.

EXAMPLE 1

A seven layer biaxially oriented heat shrinkable plastic film was prepared by the double bubble blown film method described with reference to FIG. 3. The first outer layer was of low density polyethylene with a melt index of 2.0 decigram per minute and had a thickness of 20 microns. The second, fourth and sixth bonding layers were of ethylene vinyl acetate with a melt index of 3.0 decigrams per minute and containing about 28% by weight of vinyl acetate and each had a thickness of 8 microns. The third and fifth PVDC layers were of vinylidene chloride-methyl acrylate copolymer containing 94% by weight vinylidene chloride, with the balance being methyl acrylate and other desired compounds as mentioned earlier, and each PVDC layer had a thickness of 5 microns. The seventh layer (second outer layer) was of polypropylene with a melt index of 1.0 decigram per minute and had a thickness of 35 microns.

The resulting biaxially oriented heat shrinkable multilayer plastic film had a thickness of 80 microns and showed excellent physical properties, in particular the properties relating to barrier layer cracking. The film was flexed 100 time without any visible mechanical cracks appearing. The film also exhibited an increased punch resistance which was 30% better than a known five layer film with a thick (16 microns) layer of PVDC.

EXAMPLE 2

A nine layer plastic film was prepared by the single bubble blown film method described with reference to FIG. 4. The first outer layer was of high density polyethylene with a melt index of 2.0 decigram per minute and had a thickness of 30 microns. The second, forth and sixth bonding layers were of ethylene vinyl acetate with a melt index of 1.0 decigrams per minute and containing about 24% by weight of vinyl acetate and each had a thickness of 4 microns. The third, fifth and seventh PVDC layers were of vinylidene chloride-methyl acrylate copolymer containing 94% vinylidene chloride, each PVDC layer having a thickness of 6 microns. The ninth layer (second outer layer) was of linear low density polyethylene with a thickness of 30 microns.

The resulting multilayer plastic film had a thickness of 88 microns, and exhibited excellent resistance to flexing and cracking.

Other embodiments and examples of the invention will also be readily apparent to a person skilled in the art, the scope of the invention being defined in appended claims.

We claim:

1. A multilayer plastic film having:

at least two inner polyvinylidene chloride (PVDC) layers, outer layers comprising a polyolefin homopolymer, copolymer or ionomer, and bonding layers between the PVDC layers and between the PVDC layers and the outer layers.

2. A multilayer plastic film according to claim 1 wherein each PVDC layer comprises from about 90 to about 98% by weight of vinylidene chloride.

3. A multilayer plastic film according to claim 2 wherein each PVDC layer comprises from about 95 to about 98% by weight of vinylidene chloride.

4. A multilayer plastic film according to claim 1 wherein the PVDC layers comprise at least one copolymer selected from the group consisting of vinylidene chloride-methyl acrylate copolymer, vinylidene chloride-vinyl chloride copolymer and vinylidene chloride-acrylic acid copolymer.

5. A multilayer plastic film according to claim 1 wherein each PVDC layer has a thickness in the range of from about 3 to about 15 microns.

6. A multilayer plastic film according to claim 5 wherein each PVDC layer has a thickness in the range of from about 3 to about 10 microns.

7. A multilayer plastic film according to claim 1 wherein a first outer layer has a thickness in the range of from about 10 to about 50 microns.

8. A multilayer plastic film according to claim 7 wherein the first outer layer has a thickness in the range from about 20 to about 40 microns.

9. A multilayer plastic film according to claim 1 where a first outer layer comprises at least one material selected from the group consisting of low density polyethylene, linear low density polyethylene, metalocens-based linear low density polyethylene, polypropylene, copolymers of polypropylene, high density polyethylene and ionomers.

10. A multilayer plastic film according to claim 1 wherein a second outer layer has a thickness in the range of from about 10 to about 50 microns.

11. A multilayer plastic film according to claim 10 wherein the second outer layer has a thickness in the range of from about 20 to about 40 microns.

12. A multilayer plastic film according to claim 1 wherein a second outer layer comprises at least one material selected from the group consisting of low density polyethylene, linear low density polyethylene, metalocens-based linear low density polyethylene, polypropylene, copolymers of polypropylene, high density polyethylene and ionomers.

13. A multilayer plastic film according to claim 1 wherein each bonding layer has a thickness in the range of from about 3 to about 10 microns.

14. A multilayer plastic film according to claim 1 wherein each bonding layer comprises at least one material selected from the group consisting of ethylene vinyl acetate, ethylene methyl-acrylate and ethylene-acrylic acid copolymer.

15. A multilayer plastic film according to claim 1 wherein the thickness of said film is in the range of from about 30 to about 100 microns.

16. A multilayer plastic film according to claim 15 wherein the thickness of said film is in the range from about 40 to about 75 microns.

17. A multilayer plastic film according to claim 1 wherein there are at least three inner PVDC layers.

\* \* \* \* \*